UNITED STATES PATENT OFFICE.

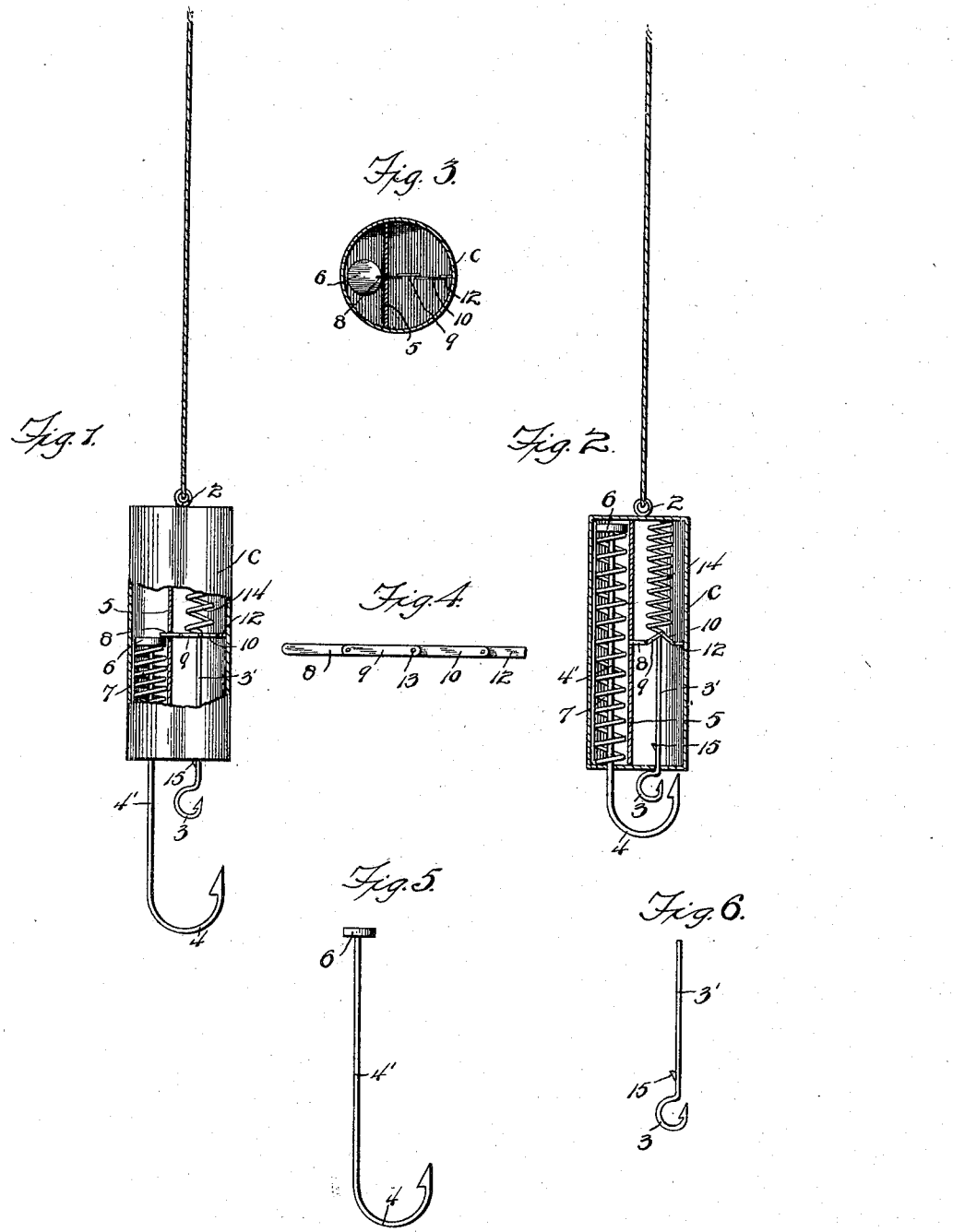

HARRY S. BUTZ, OF NORRISTOWN, PENNSYLVANIA.

FISH-HOOK.

SPECIFICATION forming part of Letters Patent No. 639,355, dated December 19, 1899.

Application filed April 7, 1899. Serial No. 712,084. (No model.)

*To all whom it may concern:*

Be it known that I, HARRY S. BUTZ, a citizen of the United States, residing at Norristown, in the county of Montgomery and State of Pennsylvania, have invented a new and useful Fish-Hook, of which the following is a specification.

This invention relates to fish-hooks, and it employs in its construction an impaling-hook and a bait-hook, the latter controlling the operation of the former; and the object of the invention is to provide a simple and effective device of the character specified wherein the impaling-hook, which is spring-actuated, will be released when a fish nibbles on the bait upon the bait-hook, thereby preventing the fish from escaping when the bait is consumed.

The device includes in its construction a case, impaling and bait hooks, springs coöperative with and serving to operate the respective hooks, a stop connected to and released on the motion of the bait-hook and adapted when at rest to secure the impalement-hook in its effective position, and means operative with the bait-hook for holding the same set. When the bait-hook is released, it serves to operate the stop to which reference has been made, thereby freeing the impalement-hook, so that the spring controlling the latter can operate it and thrust it through the gills of the fish or other part of the body, thereby preventing positively the escape of said fish.

With these ends in view the invention consists in the novel combination of elements and in the construction and arrangement of parts, which will be hereinafter fully described and claimed.

To enable others to understand the invention, I have illustrated the preferred embodiment thereof in the accompanying drawings, forming a part of this specification, and in which—

Figure 1 is a side elevation of a fish-hook constructed in accordance with my invention and with portions of the casing removed and showing the stop in the position occupied thereby when holding the impalement-hook in its effective position. Fig. 2 is a longitudinal central sectional view of the same, showing the two hooks as released. Fig. 3 is a transverse sectional plan view, the section being taken just above the toggle. Fig. 4 is a detail in side elevation of the toggle and the bolt or stop, and Figs. 5 and 6 are detail views in elevation of the two hooks.

Like characters denote like and corresponding parts in each of the several figures of the drawings.

The appliance involves in its organization a carrier or casing which may be of any suitable construction, but which is represented as consisting of a longitudinal tube C, which serves to inclose the operating-springs for the impalement and bait hooks and certain other parts and the opposite ends of which are closed. One of the closed ends of the casing is provided with an eye or ring 2, adapted to receive the end of a line, and the case, with its inclosed parts, is sufficiently heavy to avoid the necessity of a separate sinker.

The bait-hook is denoted by 3 and the impalement-hook by 4 and their shanks by 3' and 4', respectively, said shanks being disposed in parallelism and passing through guide openings or perforations in the lower closed end of the casing.

The wall 5 divides the casing into two separate compartments or chambers, in which the two shanks are located, and the operating-springs for the respective hooks are also located in these compartments.

The shank 4' terminates in the head 6 and is surrounded by the coiled spring 7, which bears against said head and also against the lower closed end of the casing, and the spring serves to supply the actuating force for shooting the impaling-hook upward, and the latter is held in its effective position by means of the stop 8, extending through an opening near the center of the dividing-wall 5 and adapted to be engaged by the head 6 when the spring 7 is compressed. When the stop or bolt 8 is drawn back across the path of the head 6, the latter, and consequently the hook 4, will be released, so that the coiled spring 7 by relaxing can elevate the impalement-hook. The bolt 8 is connected to the arm 9 of a dead-lock toggle, the complemental toggle-arm 10 being pivoted to the projection 12 on the casing, and the pivot 13, which unites the two toggle-links, is joined to the upper end of the shank 3'. The coiled spring 14 is secured, respectively, to the upper closed end of the casing and also to the shank 3' and serves as a means when the bait-hook is released for breaking the toggle, so as to draw back the stop or bolt 8 and release the impalement-hook.

The shank 3' is provided near its lower end with the catch or projection 15, adapted when the bait-hook is set to engage the under side of the lower closed end of the tubular casing. When a fish nibbles upon the bait upon the hook 3 and as he draws back, he will swing the shank 3' to what is herein illustrated the right, thereby carrying the catch or projection 15 out of contact with the casing, and thereby release the bait-hook, so that it can be immediately forced upward by the power of the spring 14', and, as before stated, during this action the toggle-links will be flexed and the stop 8 will be drawn back to free the impalement-hook.

To set the device, the casing will be held at the upper end and the hook 4 will be drawn downward the proper distance, after which the same operation will be repeated with respect to the hook 3, and when the latter is in its proper position the catch 15 will engage the casing, at which point the stop 8 will be in contact with the head or enlargement 6. The hook 3 can then be baited and the appliance cast into the water.

The point of the impalement-hook is made very sharp, and it extends beyond the point of the bait-hook, so that when the fish is taking the bait the point of said hook 4 will be located well under the gills, thereby insuring the proper operation of the impalement-hook when it is released.

The appliance constructed as hereinbefore described is exceedingly simple and can be manufactured at a low cost, and it is quick in operation, which is of importance in this class of articles, as the moment that a fish nibbles upon the bait and moves backward to the smallest possible extent the impalement-hook is instantly released and serves to catch the fish.

Changes in the form, proportion, size, and the minor details of construction within the scope of the appended claims may be resorted to without departing from the spirit or sacrificing any of the advantages of this invention.

Having thus described the invention, what I claim is—

1. In a device of the class described, the combination with a casing, of impalement and bait hooks, a separate spring connected with each of said hooks, means for holding the bait-hook against the tendency of its spring, and means connected with the bait-hook for holding the impalement-hook against the tendency of its spring and adapted to release said spring when the bait-hook spring is released.

2. In a device of the class described, the combination with a casing, of impalement and bait hooks, a separate spring connected with each of said hooks, a stop upon the bait-hook adapted to engage the casing and hold said hook against the tendency of its spring, and movable means connected with the bait-hook for holding the impalement-hook against the tendency of its spring and adapted to be drawn from its operative relation thereto when the bait-hook stop is released from the casing.

3. In a device of the class specified, the combination with a case, of impalement and bait hooks, springs coöperative with the hooks, a stop adapted to lock the impalement-hook in its working position, a toggle connected respectively to the stop and to the bait-hook, and means for holding the bait-hook set, substantially as described.

4. In a device of the class specified, the combination with a case, of impalement and bait hooks the shanks of which are disposed in parallelism in said case and the shank of the impalement having a head, a spring acting respectively against said head and the case, a stop or bolt adapted to engage the head, a toggle connected with the stop and also with the case and connected also with the shank of the bait-hook, a spring united to the base and to the shank of the bait-hook, and a catch on said last-mentioned shank adapted to engage the case thereby to hold said bait-hook set, substantially as described.

5. In a device of the class specified, the combination with a case having closed ends and divided into two compartments, of impalement and bait hooks located in the respective compartments and the shanks of which extend through openings in the closed lower end of the case, and the shank of the bait-hook having a catch adapted to engage said case and the shank of the impalement-hook having a head, a coiled spring surrounding the shank of the impalement-hook and bearing against the head thereon, a wall dividing the case into two compartments, a stop or bolt projecting through an opening in said wall and adapted to be engaged by said head, a toggle connected respectively with the stop and the case and also connected with the shank of the bait-hook, and a second spring secured to said last-mentioned shank and also to the upper closed end of the case, substantially as described.

6. In a device of the class specified, the combination with a case, of impalement and bait hooks, an impalement-hook-holding stop, and a toggle connected respectively with said stop and with the bait-hook, substantially as specified.

In testimony that I claim the foregoing as my own I have hereto affixed my signature in the presence of two witnesses.

HARRY S. BUTZ.

Witnesses:
C. S. SHEWE,
GILBERT R. FOX.